United States Patent [19]

Logemann, Jr.

[11] B 3,919,649

[45] Nov. 11, 1975

[54] STAIRCASE WAVEFORM GENERATOR

[75] Inventor: Hugo Logemann, Jr., Concord, Mass.

[73] Assignee: RCA Corporation, New York, N.Y.

[22] Filed: Oct. 31, 1973

[21] Appl. No.: 411,356

[44] Published under the Trial Voluntary Protest Program on January 28, 1975 as document no. B 411,356.

[52] U.S. Cl. ................. 328/186; 328/144; 307/227

[51] Int. Cl.$^{2}$ .......................................... H03K 4/02

[58] Field of Search.................... 328/144, 145, 186; 307/227

[56] References Cited

UNITED STATES PATENTS

| | | | |
|---|---|---|---|
| 2,525,941 | 8/1970 | Smith | 328/186 X |
| 2,529,547 | 11/1950 | Fisher | 328/186 X |
| 2,858,434 | 10/1958 | Tollefson | 328/186 |
| 3,628,061 | 12/1971 | Jackman | 307/227 X |
| 3,654,558 | 4/1972 | Tomisawa | 307/227 X |
| 3,659,048 | 4/1972 | Zuerblis et al. | 328/186 X |
| 3,714,461 | 1/1973 | Dodson | 328/186 X |

*Primary Examiner*—John S. Heyman
*Attorney, Agent, or Firm*—Edward J. Norton; William Squire

[57] ABSTRACT

Apparatus for generating a staircase test signal includes means for generating a staircase waveform wherein each step differs in value by the factor $x$. This generated waveform is then applied selectively to a $\sqrt{x}$ attenuator circuit to change the value of a portion of each step by the factor $\sqrt{x}$, thereby producing a waveform wherein each of the resultant steps differ in value by the factor $\sqrt{x}$.

10 Claims, 3 Drawing Figures

STAIRCASE WAVEFORM GENERATOR

FIELD OF THE INVENTION

The present invention relates to the generation of staircase waveforms.

BACKGROUND OF THE INVENTION

A typical application for a staircase waveform is in the testing of television display systems. In particular, the staircase waveform is used to test a television display to ensure proper operation of the display throughout the gray scale range from white to black.

Generally, the staircase waveform used for the testing of television displays in the gray scale range is one in which the steps of the staircase wave vary in amplitude by a constant factor. As is well known, the eye best perceives $\sqrt{2}$ variations of the gray scale.

To generate a staircase waveform in which the steps differ by a factor of $\sqrt{2}$ to produce such a gray scale would require complex resistance networks. A separate resistance network has to be provided for each of the steps of the waveform. Due to this complexity, approximations of the desired $\sqrt{2}$ factor between waveform steps are usually provided. These approximation waveforms are digitally generated wherein the steps differ in value from each other by an integral value, rather than by the $\sqrt{2}$ value.

SUMMARY OF THE INVENTION

An apparatus for generating a staircase waveform comprises means for generating a multilevel waveform having a plurality of step transitions wherein each step transition differs in value from the next adjacent step transition by a factor having a first value. Means selectively coupled to the waveform generating means are provided for altering by a second value a selected portion of each of the step transitions during a selected time interval intermediate each shift in value of level of the waveform to thereby produce a multilevel waveform wherein each level progressively differs in value from the next adjacent level by the second value.

DETAILED DESCRIPTION

Figure 1:
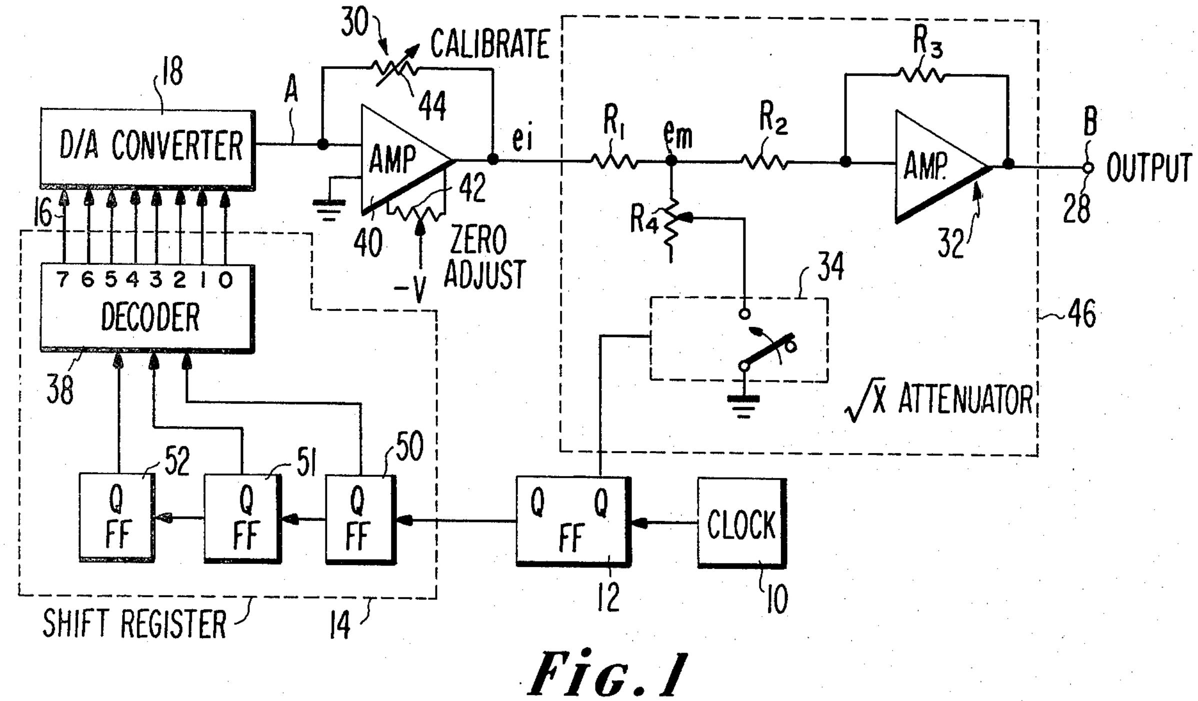
FIG. 1 is a block diagram of a circuit for generating staircase waveforms in accordance with an embodiment of the present invention.

The apparatus of FIG. 1 includes a clock 10 which drives a conventional flip-flop 12. A Q output of flip-flop 12 drives serial-in parallel-out shift register 14. Shift register 14 has a plurality of parallel outputs 16. Outputs 16 are connected as respective inputs to digital-to-analogue converter 18.

Figure 2:
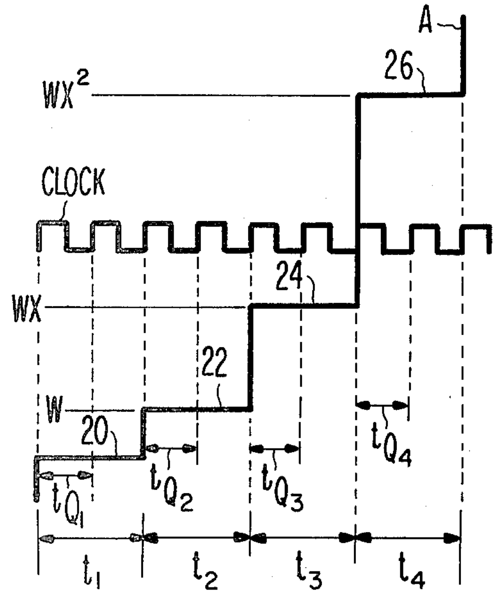
FIG. 2 illustrates the waveform generated by the digital-to-analogue converter in the block diagram of FIG. 1.
Figure 3:
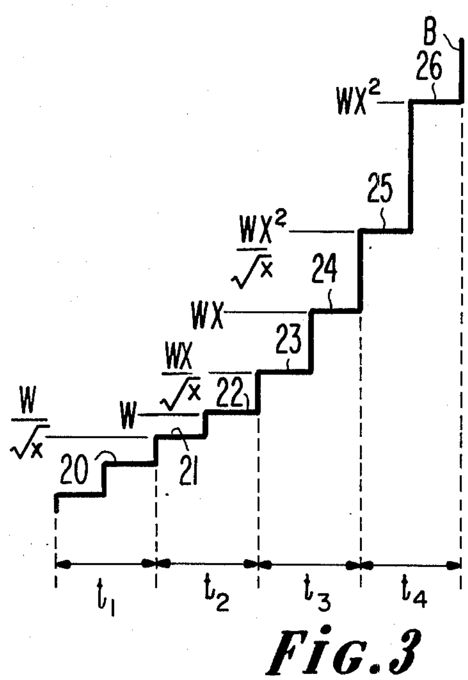
FIG. 3 illustrates the output waveform of the device constructed and operated in accordance with the present invention.

Digital-to-analogue converter 18 converts the input signals applied thereto from outputs 16 into a staircase waveform A, FIG. 2. Waveform A is applied as an input to $\sqrt{x}$ attenuator 46 through calibrate and zero adjust circuit 30. Circuit 30 includes amplifier 40, variable calibrate resistance 44 coupled across amplifier 40 and zero adjust resistance 42 connected to amplifier 40. Resistance 42 adjusts the zero level of waveform A, while resistance 44 adjusts the full scale range of waveform A. The output of attenuator 46, waveform B, FIG. 3, is applied to terminal 28.

Attenuator 46 includes first and second like resistances $R_1$ and $R_2$ having the same value. Resistances $R_1$ and $R_2$ are serially connected between circuit 30 and amplifier 32. Across amplifier 32 is a feedback resistance $R_3$, which is twice the value of either resistance $R_1$ or $R_2$. The output of amplifier 32 is connected to output terminal 28.

Resistance $R_4$ is connected at one end thereof to the junction of serially connected resistances $R_1$ and $R_2$. The other end of resistance $R_4$ is connected to a reference potential such as system ground through on-off switch 34. Switch 34 is an electronic switch responsive to the Q output of flip-flop 12 coupled thereto. When a logical one, i.e., a high, appears on the Q output in all odd cycles of clock 10, switch 34 is placed in the closed state coupling resistance $R_4$ to ground.

During these odd cycles, resistance $R_4$ together with resistances $R_1$ and $R_2$ form a voltage dividing network. The resistance $R_4$ is made that value such that the signal applied to output terminal 28 through attenuator 46 from circuit 30 is divided by $\sqrt{x}$. It can be shown that resistance $R_4$ has a value of $R/2(\sqrt{x}-1)$ when $R_1=R_2=R$, and $R_3=2R$, provided that the gain of amplifier 32 is large compared to unity. Resistance R4 is preferably variable to enable one to precisely set this value in the resistance $R_4$.

When switch 34 is placed in the open state during all even cycles of clock 10, resistance $R_4$ is of no effect in attenuator 46. In this case the signal applied to x attenuator 46 from circuit 30 is applied through serial resistances $R_1$ and $R_2$ and amplifier 32 including feedback resistance $R_3$. Since the sum of resistances $R_1$ and $R_2$ is about the same as the value of resistance $R_3$, this network provides unity gain. Therefore, the amplitude of waveform B appearing at output terminal 28 during all even cycles of the clock 10 will be equal to the amplitude of waveform A.

Shift register 14 preferably comprises in one form a counter and decoder which function as a shift register. The counter comprises three serially connected flip-flops 50, 51 and 52. The Q output of each of flip-flops 50-52, inclusive, is connected as an input to decoder 38. The outputs of flip-flop 50–52 are a digitally encoded binary counter. Each binary count is present for two clock cycles. Each different binary count of flip-flops 50–52 causes a signal, i.e., a logical one, to appear on one of decoder 38 outputs 0–7. This logical one appears on only one decoder output 0–7 during two successive clock cycles. The logical one state is shifted successively among outputs 0–7 on alternate clock cycles. In the FIG. 1 embodiment, the logical one state is shifted sequentially from the 0 output to the 7 output. The decoder outputs 0–7 are connected respectively to shift register 14 outputs 16, a separate different output 16 being connected to a corresponding, different decoder output 0–7.

Digital to analogue converter 18 generates waveform A in response to the logical one signals applied thereto on output 16. Each step 20, 22 24, 26, . . . of waveform A, FIG. 2, corresponds to a separate, different output 16 of shift register 14. When a logical one appears on one of outputs 16, a corresponding step 20, 22, 24 26, . . . is generated by converter 18.

Each of steps 20, 22, 24 and 26 of the waveform A differ in amplitude from the next adjacent step by an integral factor $x$, preferably 2. Thus, if step 22 is assigned an amplitude of $w$, the next occurring step 24 is provided an amplitude of $wx$, the next occurring step 26 is provided an amplitude of $wx^2$, and so forth, when x has a value of 2. The relationship of the amplitude of each step at the output of amplifier 40 to the amplitude of the remaining steps at the output 28 is directly related to the amount of attenuation in attenuator 46 as provided in accordance with the present invention.

It is seen that each step 22, 24 and 26 is the square of the next precceding step in waveform A, FIG. 2, when $x$ is assigned the value of 2. Intermediate steps 21, 23 and 25, FIG. 3, between steps 20 and 22, 22 and 24, 24 and 26, respectively, are provided with respective amplitudes that are the square root of the next successively occurring step. It is thus apparent that each step 20–26 of waveform B differs in value from the next adjacent steps by the factor $\sqrt{x}$ when $x$ has the value 2.

The significance of the structure of FIG. 1 is that a single resistive network comprising attenuator 46 produces all of the intermediate steps 21, 23, 25 having different amplitudes. These steps are produced by the same identical resistances having a unique relationship to each other and to a unique waveform A. Further, these intermediate steps have a commonality with the waveform A steps such that a unique waveform B results in which each step has a given predetermined relationship with the next adjacent succeeding and preceeding steps.

In operation, clock 10 provides a serial stream of pulses to flip-flop 12. The Q output of flip-flop 12 is at one-half the clock rate and provides the shift pulses to shift register 14. The shift pulses are serially applied to flip-flops 50–52. The Q outputs of each of flip-flops 50–52 are applied in parallel to decoder 38. The decoder inputs from flip-flops 50–52 form a digitally encoded binary number. This binary number increases sequentially in value in a conventional manner as the clock runs. The binary number recycles automatically.

Decoder 38 decodes this binary number and provides a logical one on only one of outputs 0–7 in accordance with the value of that binary number then being applied thereto. For example, let the binary number appearing on the parallel Q outputs of flip-flops 50–52 represent the sequential occurrence of numbers 0–7. Then, the signals appearing on decoder 38 outputs 0–7 are logical ones, i.e., highs, which successively occur on outputs 0–7 in accordance with the following Table I.

TABLE 1

| Clock Interval | Decoder 38 Outputs 7 | 6 | 5 | 4 | 4 | 2 | 1 | 0 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 1 |
| 3 | 0 | 0 | 0 | 0 | 0 | 0 | 0 | 1 |
| 4 | 0 | 0 | 0 | 0 | 0 | 0 | 1 | 0 |
| 5 | 0 | 0 | 0 | 0 | 0 | 0 | 1 | 0 |
| 6 | 0 | 0 | 0 | 0 | 0 | 1 | 0 | 0 |
| 7 | 0 | 0 | 0 | 0 | 0 | 1 | 0 | 0 |
| 8 | 0 | 0 | 0 | 0 | 1 | 0 | 0 | 0 |
| 9 | 0 | 0 | 0 | 0 | 1 | 0 | 0 | 0 |
| 10 | 0 | 0 | 0 | 1 | 0 | 0 | 0 | 0 |
| 11 | 0 | 0 | 0 | 1 | 0 | 0 | 0 | 0 |
| . | | . | | | | | | |
| . | . | . | . | . | . | . | . | . |
| . | . | . | . | . | . | . | . | . |
| . | . | . | . | . | . | . | . | . |
| n | 1 | 0 | 0 | 0 | 0 | 0 | 0 | 0 |

As seen in Table I the logical one state remains on each of decoder 38 outputs 0–7 for the duration of two clock pulses. As a result, each of steps 22, 24 and 26 of the staircase waveforms A, FIG. 2, produced by digital-to-analogue converter 18 are two clock cycles in length. Each step 20, 22, 24 and 26 differs in value from the next adjacent step by the factor $x$, having an assigned value of 2, as explained above. The waveform is then applied to attenuator 46.

In the meantime, the Q output of flip-flop 12 is also being applied to switch 34. Switch 34, being closed when flip-flop 12 Q output is a logical one, i.e., a high, is closed during all odd cycles of the clock. These odd cycles occur in periods $t_{Q1-4}$, FIG. 2. During all even cycles of clock 10, switch 34 is open.

As a result, during all odd cycles of clock 10, resistance $R_4$ is coupled to system ground through switch 34. When thus connected the divider network comprising resistances $R_1$, $R_2$ and $R_4$ is formed. This divider network in conjunction with amplifier 32 and feedback resistance $R_3$ serves to divide waveform A applied thereto by an amount $\sqrt{x}$, $x$ being 2. This division occurs during the first half interval $T_{Q1-Q4}$ of each respective corresponding period $t_1$–$t_4$ of corresponding steps 20, 22, 24 and 26. This procedure generates steps 21, 23 and 25 of waveform B, FIG. 3.

In the remaining last half interval of each respective period $t_1$–$t_4$, switch 34 is open. Therefore, during these intervals attenuator 46 passes waveform A unchanged to output terminal 28 to form steps 20, 22, 24 and 26 of waveform B. Waveform A is unchanged by attenuator 46 due to the unity gain of the network comprising resistances $R_1$, $R_2$, $R_3$ and amplifier 32. It will be recalled that the sum of resistances $R_1$ and $R_2$ is the same as the amount of resistance $R_3$, and that the gain at amplifier 32 is large compared to unity.

It will thus be appreciated that there has been described a staircase waveform generator which generates a waveform wherein each step differs in value from the next adjacent step by the factor $x$. This waveform is generated by an apparatus in which a suitable circuit is provided which produces a waveform having a progression of steps with a predetermined relationship to each other. Each step in this progression differs in value from the next adjacent step whether succeeding or preceeding, by the factor $x$.

A single resistive attenuating network is provided which attenuates by $\sqrt{x}$ a portion of all of the different steps in the progression. Consequently, each step of the resultant waveform differs in value from the next adjacent step by the factor $\sqrt{x}$.

What is claimed is:

1. In combination:

means for generating a staircase waveform having a progression of step transitions wherein each step transition differs in value from the next adjacent step transition by a factor having a first value, and means including a single resistive network selectively altering the value of a selected portion of each of said step transitions by a factor having a second value to produce an intermediate step transition disposed between successive ones of said progression of step transitions to thereby generate a staircase waveform wherein each step transition differs in value from the next adjacent step transition by said second value.

2. An apparatus for generating a waveform comprising:

means for generating a multilevel digital waveform having a progression of step transitions wherein each step transition differs in value from the next adjacent step transition by a factor having a first value, and means selectively coupled to said generating means altering by a second value a selected portion of each said step transition during a selected time interval intermediate each shift in value of level of said waveform to produce a multilevel waveform wherein each level differs in value from the next adjacent level by said second value.

3. The apparatus of claim 2 wherein said multilevel waveform producing means includes a single resistive voltage dividing network.

4. The apparatus of claim 3 wherein said multilevel waveform producing means includes amplifying means serially coupled to said dividing network.

5. The apparatus of claim 2 wherein said multilevel waveform producing means includes an output terminal and first and second like resistances serially connected between said output terminal and said digital waveform generating means, and a third resistance selectively coupled to the junction of said first and second resistances and a reference potential for dividing the selected portions of said digital waveform by a given amount, and amplifying means including a feedback resistance coupled between one of said first and second like resistances and said output terminal for multiplying said multilevel digital waveform by unity when said third resistance is decoupled from said reference potential.

6. In combination:

a shift register, a clock having a certain repetition rate, means for coupling the clock to the shift register and for providing shift pulses at half the clock rate, a digital-to-analogue converter coupled to said shift register for generating a staircase waveform wherein each step transition is generated at half the clock rate, each level of said staircase waveform differing in value from the next adjacent level by a first factor, an output terminal, attenuating means including a voltage dividing network selectively coupled between said output terminal and said digital-to-analogue converter for attenuating the waveform selectively coupled thereto by a second factor, and means responsive to said clock for selectively coupling said attenuating means between said output terminal and said digital-to-analogue converter during alternate clock cycles occurring intermediate the level transitions of said staircase waveform.

7. The combination of claim 6 wherein said selectively coupling means includes a flip-flop having an output signal thereof at a first level in response to all even cycles of said clock and at a second level in response to all odd cycles of said clock, and switching means responsive to said first and second levels for coupling said dividing network between said output terminal and said digital-to-analogue converter during either said odd or even cycles.

8. The combination of claim 6 wherein said voltage dividing network includes like first and second resistances serially coupled between said digital-to-analogue converter and said output terminal, an amplifier circuit including a feedback resistance, and a third resistance coupled between the junction of said first and second resistances and said selectively coupling means, the values of said first, second and third resistances serving to divide the staircase waveform selectively applied thereto by said second factor.

9. The combination of claim 8 wherein the value of said first and second resistances is about the same and about one-half the value of said feedback resistance.

10. The combination of claim 6 wherein said first factor is $x$ and said second factor is $\sqrt{x}$.

* * * * *